United States Patent
Kennedy, Jr. et al.

(10) Patent No.: US 7,778,608 B2
(45) Date of Patent: *Aug. 17, 2010

(54) SYSTEM AND METHOD FOR ESTIMATING THE MULTI-PATH DELAYS IN A SIGNAL USING A SPATIALLY BLIND ANTENNA ARRAY

(75) Inventors: Joseph P. Kennedy, Jr., Great Falls, VA (US); John P. Carlson, Herndon, VA (US); Martin Alles, Hamilton Parish (BM)

(73) Assignee: Andrew LLC, Hickory, NC (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/078,471

(22) Filed: Mar. 31, 2008

(65) Prior Publication Data

US 2008/0194207 A1   Aug. 14, 2008

Related U.S. Application Data

(63) Continuation-in-part of application No. 10/531,039, filed as application No. PCT/US03/32585 on Oct. 16, 2003, now Pat. No. 7,379,757.

(60) Provisional application No. 60/418,342, filed on Oct. 16, 2002.

(51) Int. Cl.
*H04B 17/00* (2006.01)
(52) U.S. Cl. ............... 455/67.11; 455/562.1; 455/115.1; 455/278.1
(58) Field of Classification Search ............... 455/562.1, 455/101, 115.1, 67.11, 24, 19, 25, 67.13, 455/66.1, 65, 277.1, 278.1, 279.1, 63.4, 67.16; 375/347, 349
See application file for complete search history.

(56) References Cited

U.S. PATENT DOCUMENTS

| | | | |
|---|---|---|---|
| 3,975,731 A | 8/1976 | Latham et al. | |
| 4,144,571 A | 3/1979 | Webber | |
| 4,520,445 A | 5/1985 | Keearns | |
| 4,783,744 A | 11/1988 | Yueh | |

(Continued)

FOREIGN PATENT DOCUMENTS

JP        06-347529        * 12/1994

(Continued)

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner*—John Lee
(74) *Attorney, Agent, or Firm*—Duane Morris, LLP (57) ABSTRACT

A method is described that enables a system to estimate the individual times of arrival of multi-path signals components in a received signal while blind to the particular angular response characteristics of an antenna array. Additionally, a system is described that estimates the impulse response of the modulation channel. The impulse response is used to generate impulse response estimates for all multi-path signal components without reference to the actual angle of arrival of the signal. The impulse responses for the multi-path constituents are directly associated with the time delays on each path, providing delay estimates for each path.

8 Claims, 4 Drawing Sheets

U.S. PATENT DOCUMENTS

| | | | |
|---|---|---|---|
| 4,954,837 | A | 9/1990 | Baird et al. |
| 5,317,323 | A | 5/1994 | Kennedy et al. |
| 5,465,289 | A | 11/1995 | Kennedy |
| 5,506,863 | A | 4/1996 | Meidan et al. |
| 5,870,029 | A | 2/1999 | Otto et al. |
| 5,960,355 | A | 9/1999 | Ekman et al. |
| 6,144,711 | A * | 11/2000 | Raleigh et al. .............. 375/347 |
| 6,166,691 | A | 12/2000 | Lindqvist |
| 6,188,351 | B1 | 2/2001 | Bloebaum |
| 6,198,935 | B1 | 3/2001 | Saha et al. |
| 6,212,319 | B1 | 4/2001 | Cayrefourcq |
| 6,212,391 | B1 | 4/2001 | Saleh et al. |
| 6,295,455 | B1 | 9/2001 | Fischer et al. |
| 6,298,092 | B1 * | 10/2001 | Heath et al. ................ 375/267 |
| 6,311,043 | B1 | 10/2001 | Haardt et al. |
| 6,334,059 | B1 | 12/2001 | Stilp et al. |
| 6,377,819 | B1 * | 4/2002 | Gesbert et al. ........... 455/562.1 |
| 6,470,195 | B1 | 10/2002 | Meyer |
| 6,477,161 | B1 | 11/2002 | Hudson et al. |
| 6,501,955 | B1 | 12/2002 | Durrant et al. |
| 6,553,322 | B1 | 4/2003 | Ignagni |
| 6,782,264 | B2 | 8/2004 | Anderson |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,920,329 | B2 | 7/2005 | Kennedy, Jr. et al. |
| 6,922,170 | B2 | 7/2005 | Alexander, Jr. |
| 6,952,158 | B2 | 10/2005 | Kennedy, Jr. |
| 2002/0094821 | A1 | 7/2002 | Kennedy, Jr. |
| 2002/0111158 | A1 | 8/2002 | Tee |
| 2002/0151325 | A1 | 10/2002 | Fitton et al. |
| 2002/0175855 | A1 | 11/2002 | Richton et al. |
| 2003/0054813 | A1 | 3/2003 | Riley et al. |
| 2003/0069024 | A1 | 4/2003 | Kennedy, Jr. |
| 2003/0190919 | A1 | 10/2003 | Niemenmaa |
| 2004/0043775 | A1 | 3/2004 | Kennedy, Jr. et al. |
| 2004/0067759 | A1 | 4/2004 | Spirito et al. |
| 2004/0198279 | A1 | 10/2004 | Anttila et al. |
| 2004/0220728 | A1 | 11/2004 | Cayford |
| 2004/0266457 | A1 | 12/2004 | Dupray |
| 2005/0136945 | A1 | 6/2005 | Kennedy et al. |
| 2005/0164712 | A1 | 7/2005 | Kennedy, Jr. et al. |

FOREIGN PATENT DOCUMENTS

| | | |
|---|---|---|
| JP | 60-347529 | 12/1994 |

OTHER PUBLICATIONS

Ziskind, I., Wax, M., "Maximum likelihood localization of multiple sources by alternating projection", IEEE Trans. Acoust., Speech, Signal Process. vol. 36, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing.

Paulraj, A.J., Papadias, C.B., "Space-Time Signal Processing for Wireless Communications", IEEE Signal Processing Magazine, vol. 11 (Nov. 1997), 49-83.

Paulraj, A.J., Papadias, C.B., "Space-Time Signal Processing for Wireless Communications: A Survey" Information System Laboratory, Stanford University.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thInternational Conf. on Universal Personal Communications, vol. 2 (Oct. 1996), 827-831.

L.Cong and W.Xuang, "Non-Line-of-Sight Error Mitigation in TDOA mobile location" Proc. IEEE Global Telecommunications conference vol. 1 (2001), 680-684.

P.C. Chen, "A non-line-of-sight error mitigation algorithm in location estimating" Proc. IEEE Conf. on wireless Communications Networking, vol. 1 (1999), 316-320.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Caffery, J., Jr., "A New Approach to the Geometry of TOA Location," IEEE, VTC 2000, pp. 1943-1949.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing, (1999).

Paulraj, A.J., Papadias, C.B., "Space-Time Signal Processing for Wireless Communications: A Survey" Information System Laboratory, Stanford University (Apr. 16-18, 1997.

* cited by examiner

FIGURE 4

SYSTEM AND METHOD FOR ESTIMATING THE MULTI-PATH DELAYS IN A SIGNAL USING A SPATIALLY BLIND ANTENNA ARRAY

CROSS REFERENCES

The present application is a divisional of and claims priority benefit of U.S. patent application Ser. No. 10/531,039, now U.S. Pat. No. 7,379,757, filed Oct. 19, 2005, which is a 371 National stage application of PCT/US03/32585, filed Oct. 16, 2003 which claims priority benefit of U.S. provisional application entitled "Geolocation of Mobile Appliances" Application No. 60/418,342 and filed Oct. 16, 2002, the entirety of which is incorporated herein by reference.

The present application is related to and concurrently filed with applications titled "A Network Overlay Geo-Location System With Smart Antennas and Method of Operation", application Ser. No. 10/351,040, "Wireless Communication Network Measurement Data Collection Using Infrastructure Overlay-Based Handset Location Systems" application Ser. No. 10/531,042, "Network Overlay Location System And Method For air Interface With Frequency Hopping" application Ser. No. 10/531,041, "A System and Method For Enhancing The Accuracy of a Location Estimate", application Ser. No. 10/531,044, and "System and Method for Operating a Network Overlay Geo-Location System With Repeaters", application Ser. No. 10/531,038, filed Oct. 16, 2003, the entirety of each of these applications is incorporated herein by reference.

BACKGROUND

Figure 1:
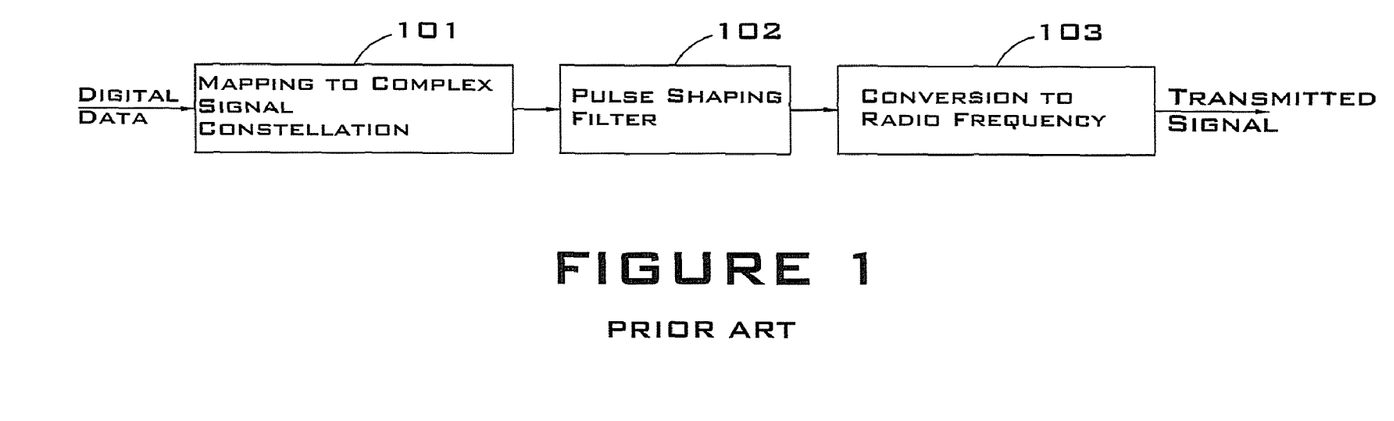
FIG. 1 is a representative flow chart of a portion of a prior art system and/or method for transmitting a digital signal.

Digital signals are often filtered using a pulse shaping filter prior to transmission. This is typically done to contain the signal bandwidth and minimize intersymbol interference between signal components corresponding to different digital symbols. This is shown in FIG. 1, where symbols from a digital constellation corresponding to the information being modulated are passed though a pulse shaping filter. In FIG. 1, the digital data to be transmitted is mapped into a complex signal constellation in block 101. For example, the complex signal constellation used may be an M-ary QAM constellation; however other constellations are also used. The mapped constellation undergoes pulse shaping in a filter as shown in block 102. Several methods known in the art can be employed for pulse shaping. The filtered constellation signal is converted to a radio frequency, represented as block 103, for transmission over the ether.

An artifact of this signal generation provides an unintended feature that has been the focus of recent investigation. If the digital signal is passed through a multi-path channel, the channel output is an aggregate of delayed, possibly faded and phase shifted replicas of the original digital signal. In practice, this occurs if a multiplicity of reflections of the transmitted signal are contained in the received signal. The delays can either be absolute, if the time of arrival of the direct path signal is known, or could be relative delays between the multi-path components. If these multi-path signals are received at the antenna array, the received signal can be mathematically formulated as a space-time signal.

When the characteristics of the pulse shaping filter and the antenna array are known, a theory of signal processing can be applied to estimate the multi-path delays of the signal components and their particular directions of arrival. This signal processing analysis is referred to as space-time processing. Space-time processing is a group of techniques that may be applied to resolve the received space-time signals into a sum of faded space-time signals. Each of these space time signals corresponds to the particular angle of arrival and time delay of one of the original multi-path signal components.

Figure 2:
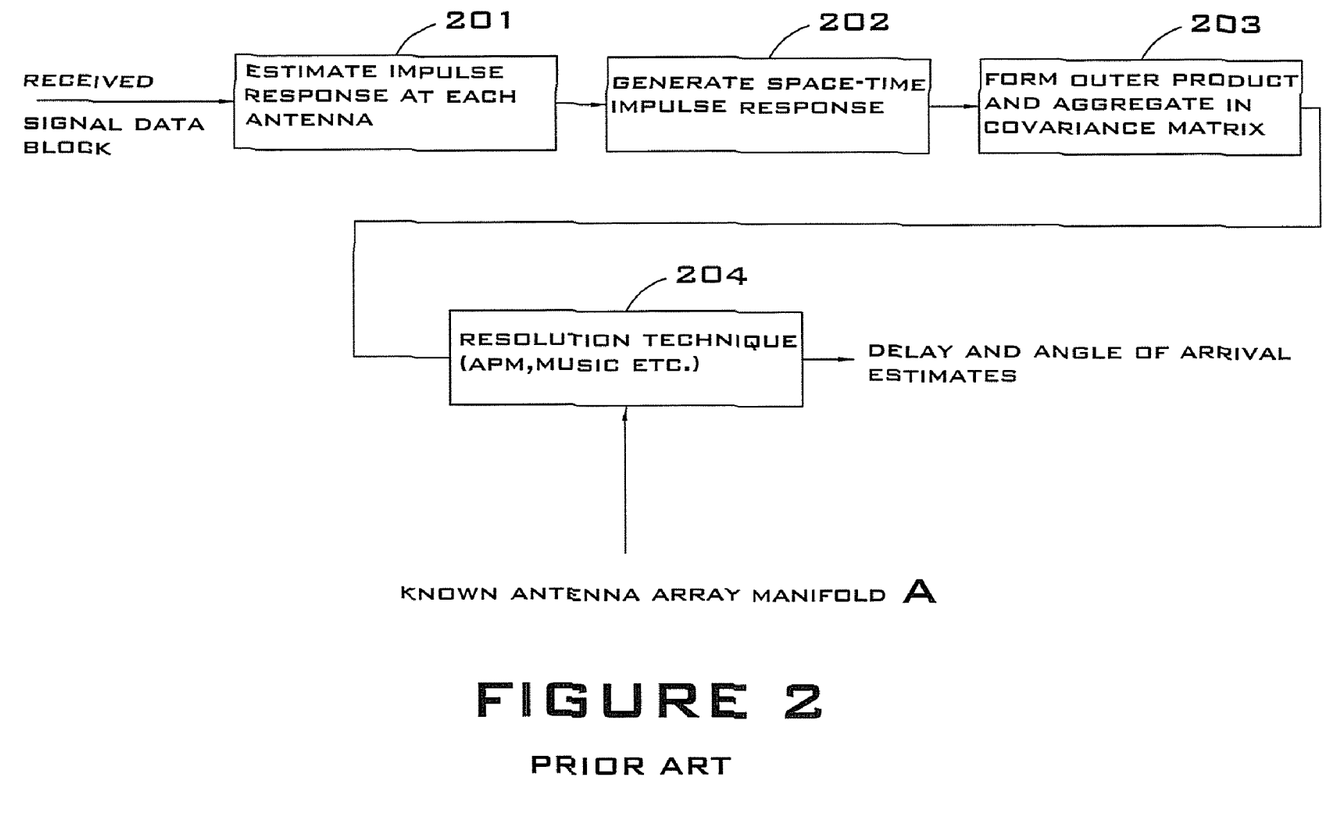
FIG. 2 is a representative flow chart of a prior art receiving system and/or method for space-time processing a received signal.

It is advantageous to develop a mathematical description of the prior art technique to convey the manner in which multi-path delays and angle of arrival ("AOA") are currently calculated to fully appreciate the distinctness of the to be disclosed subject matter. The prior art method is illustrated in FIG. 2.

A column vector $r_k$ denotes the received signal at antenna k of an antenna array with m antennas, where k=1, 2, ... m. An impulse response $h_k$ of the multi-path channel is derived from $r_k$, represented in block 201. The derivation of the column vector $h_k$ can be achieved by various methods and implemented with signal processors through software and/or hardware.

If the source data associated with this received block is known, a simple means of extracting $h_k$ is via the delay matrix corresponding to this source data. The delay matrix Z is formed by stacking symbol shifted copies of the source data in rows to a depth that defines the extent of the desired impulse response and truncating its longer dimension to match the length of $r_k$. An estimate of $h_k$ is given by: $h_k = (ZZ^H)^{-1} Z r_k$.

Alternate means for estimating the impulse response may provide better or worse estimates, depending on the particular modulation format of the data, the block length, the fading characteristics of the multi-path channel and possibly other parameters. Some of these other methods are blind to the actual data transmitted, using properties of either the signal modulation and/or of the channel instead.

Having estimated the impulse response of the multi-path channel from the source to antenna k of the array, a vectorized space-time impulse response over the entire array is formed, in block 202, by stacking the individual impulse response estimate $h_k$ into a long column vector $\vec{I}$, given by:

$$\vec{I} = \begin{bmatrix} h_1 \\ \ldots \\ h_k \\ \ldots \\ h_m \end{bmatrix}.$$

Theoretically, $\vec{I}$ can be expressed as $$I = \sum_{i=1}^{n} I_i + N,$$

where $\vec{I}$ indexes the individual space-time impulse responses, i=1, 2, ..., n, of the distinct multi-path components and N is a noise vector.

Any particular $I_i$ is of the form $I_i = \beta_i \eta \alpha(\theta_i) \otimes g(\tau_i)$ in which $\beta_i$ denotes the fade multiplier for the signal block, and $\eta$ denotes the signal amplitude at the transmitter. $\alpha(\theta_i)$ denotes the antenna response corresponding to a signal arriving from angle $\theta_i$, $\otimes$ denotes the Khatri-Rao product, and $g(\tau_i)$ denotes the pulse shaping waveform delayed by $\tau_i$ and sampled. This formation of an outer product and aggregate in the covariance matrix, is represented in block 203. The formation of the covariance matrix can be implemented with signal processors or other computer processors through software and/or hardware devices.

The vectors α and g can be expressed as:

$$a(\theta_i) = \begin{bmatrix} a_1(\theta_i) \\ a_2(\theta_i) \\ \dots \\ a_m(\theta_i) \end{bmatrix}, \text{ and}$$

$$g(\tau_i) = \begin{bmatrix} g(-lT_s - \tau_i) \\ g(-(l-1)T_s - \tau_i) \\ \dots \\ g(lT_s - \tau_i) \end{bmatrix}.$$

In the equation for $g(\tau_i)$, l denotes the sampling depth of the pulse shaping function and $T_s$ is the sampling time.

Given this formation of the space-time impulse response, when the number of multi-path components is smaller than the dimension of the symbol sampled impulse response vector I, it is possible to estimate the multi-path delays $\tau_i$ and the multi-path arrival angles $\theta_i$.

The prior art approach to estimating the delays and arrival angles relies on an explicit knowledge of the aggregate of all vectors:

$$a(\theta_i) = \begin{bmatrix} a_1(\theta_i) \\ a_2(\theta_i) \\ \dots \\ a_m(\theta_i) \end{bmatrix}$$

for all angles $\theta_i$. This aggregate is termed the array manifold, A. It is assumed that the pulse shaping function at the transmitter is known at the receiver. Denoting the aggregate of all vectors as $$g(\tau_i) = \begin{bmatrix} g(-lT_s - \tau_i) \\ g(-(l-1)T_s - \tau_i) \\ \dots \\ g(lT_s - \tau_i) \end{bmatrix}$$

for all values of $\tau_i$ as the delay manifold, G, then the quantity $K = A \otimes G$ represents the space-time manifold.

The observation that $I_i$ is contained in K leads to a primary objective of space-time processing: searching the manifold K for weighted linear combinations of vectors $I_i$ such that a best fit to the observed space-time impulse response $\vec{I}$ is generated as shown in block 204. A variety of techniques may be applied for this purpose, such as Multiple Signal Classification (MUSIC), The Method of Alternating Projections (APM), etc., which can be implemented through software and/or hardware. Other mathematical descriptions for jointly estimating the angle of arrival ("AOA") and time delays can be found in Ziskind, I., Wax, M., "*Maximum likelihood localization of multiple sources by alternating projection*", IEEE Trans. Acoust., Speech, Signal Process. vol. 36, no. 2 (October 1988), 1553-1560; Van Der Veen, M, Papadias, C. B., Paulraj, A. J., "*Joint angle and delay estimation*" IEEE Communications Letters vol. 1-1 (January 1997), 12-14; Schmidt, R. O. "*Multiple emitter location and signal parameter estimation*" Proc. RADC Spectrum Estimation Workshop, (March 1999), 243-258; Young-Fang Chen, Michael D. Zoltowski "*Joint Angle and Delay estimation of DS-CDMA communication systems with Application to Reduced Dimension Space-time 2D Rake Receivers*", IEEE Transactions on Signal Processing; Paulraj, A. J., Papadias, C. B., "*Space-Time Signal Processing for Wireless Communications*", IEEE Signal Processing Magazine, vol. 11 (November 1997), 49-83; Paulraj, A. J., Papadias, C. B., "*Space-Time Signal Processing for Wireless Communications. A Survey*" Information System Laboratory, Stanford University; and Haardt, Brunner and Nossek "*Joint Estimation of 2-D Arrival Angles, Propagation Delays, and Doppler Frequencies in Wireless Communications*"; all of which are incorporated herein by reference.

An object of the disclosed subject matter is to obviate the deficiencies of the prior art by removing the dependency of the time delay estimates from the spatial and gain characteristics of an antenna array thus allowing multi-path delay estimates to be obtained for any generic antenna array. This object is achieved by recasting the array manifold in a spatially blind manner so as to be independent of the array characteristics.

It is another object of the disclosed subject matter to present an improved method for estimating the multi-path delays in a signal received at any k array element. The method includes estimating an impulse response at each k antenna, generating a space-time impulse response, and forming a covariance matrix and resolving the covariance matrix with a known antenna array manifold. Additionally, a novel improvement to known methods includes the step of resolving the covariance matrix with a fictitious antenna array manifold.

It is still another object of the disclosed subject matter to present a novel method for estimating the multi-path delays in a signal using a spatially blind antenna array. The method includes generating an impulse response $h_k$ for each antenna k in the antenna array and determining a vectorized space-time impulse response I over the antenna array. The method further includes creating a covariance matrix C, a fictitious manifold $A_f$, where $A_f$ is spatially blind and independent of the array characteristics, and then resolving the covariance matrix C with the fictitious manifold $A_f$ to estimate the multi-path delays $\tau_i$ in a manner independent of the array characteristics.

It is yet another object of the disclosed subject matter to present a method of estimating the multi-path delays of a sequence of j blocks of a signal received at an antenna array comprising k antenna elements independently of the spatial array characteristics of the antenna array. The method includes deriving a channel impulse response estimates $h_{j,k}$ for each block j at each antenna k and determining a vectorized aggregate space-time impulse response I for each block j. The method includes the steps of forming an estimated covariance matrix for the sequence of j blocks, forming an array manifold $A_f$ void of spatial information; and then resolving the covariance matrix with the fictitious array manifold $A_f$ to determine the multi-path delays $\tau_i$.

It is also an object of the disclosed subject matter to present a novel system for estimating the multi-path delays in a signal using a spatially blind antenna array. The system includes an antenna array, a means for generating an impulse response $h_k$, a means determining a vectorized space-time impulse response I and a means for creating a covariance matrix C. The system also includes a means for creating a fictitious manifold $A_f$, wherein $A_f$ is spatially blind and independent of the array characteristics; and a means for resolving the covariance matrix C with the fictitious manifold $A_f$ to estimate the multi-path delays $\tau_i$ independent of the array characteristics.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

The present disclosure presents a system and method for a technique for determining the individual times of arrival of multipath signal components in a received signal. The delays in the multipath components are determined by creating a fictitious array manifold $A_f$ in which the directional knowledge of the array is absent. As discussed earlier, the vector a is produced with the knowledge of all the vectors for all angles $\theta_i$, is represented as:

$$a(\theta_i) = \begin{bmatrix} a_1(\theta_i) \\ a_2(\theta_i) \\ \ldots \\ a_m(\theta_i) \end{bmatrix}.$$

To remove the dependence on $\theta_i$, each dimension of the array takes all possible complex numbered values. The independent aggregate vector is then given by:

$$a(\theta_i) = \begin{bmatrix} a_1 \\ a_2 \\ \ldots \\ a_m \end{bmatrix},$$

where each $\alpha_k$ is contained in the complex number space C, so that the fictitious array manifold $A_f$ is the space $C^m$. This formulation allows space-time processing to proceed blind to the specific characteristics of the antenna array such as element spacing, element gain, etc.

As discussed above, the signal processing flow for the established prior art technique is shown in FIG. 2. This technique requires knowledge of the antenna array manifold A, i.e., one must have explicit knowledge of the antenna response corresponding to a signal arriving at each possible angle for each element in the antenna array. As discussed earlier, it is not always possible to easily obtain the antenna array manifold A as calibration of the antenna array is a tedious, time-consuming, and expensive task. The prior art technique allows for determination of an estimation of multipath delays and the particular angles of arrival of the multipath signals.

Figure 3:
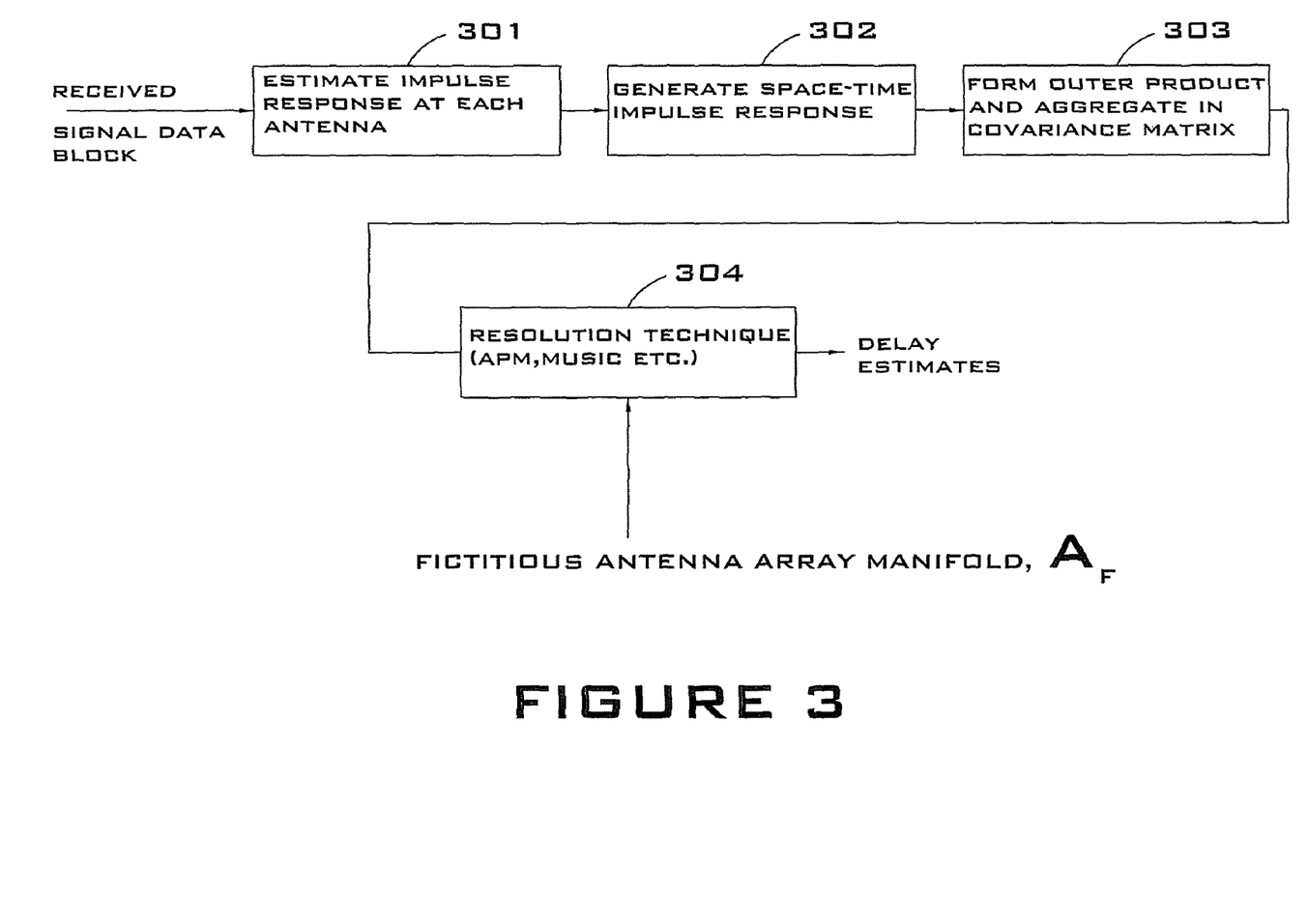
FIG. 3 is a representative flow chart for spatially blind space-time processing a received signal according to a system/method of the present disclosure.

The signal processing flow for the above-discussed subject matter, on the other hand, employs a fictitious array manifold as shown in FIG. 3. An estimate of the impulse response is determined at each antenna element as shown in block 301. From the impulse response, a space-time impulse response is generated in block 302 and an outer product and aggregate in the covariance matrix is formed in block 303 in a manner similar to that as discussed for the prior art. In block 304 the covariance matrix is resolved with the generalized fictitious antenna array manifold $A_f$ defined above rather than the known antenna array manifold A as shown in FIG. 2. While the novel techniques described herein does not allow for resolution of the particular angles of arrival of the multipath signals, it does allow for determining an estimation of the time delays of the multipath components given an antenna array with arbitrary and unknown properties. Therefore, the novel techniques herein described allow for the use of antennas separated by arbitrary distances and with arbitrary gain characteristics while still obtaining important information: the time delays of multipath signal components.

To facilitate understanding of the novel techniques described herein, an example follows for the case of a signal received at a two antenna array in which the established prior art space-time techniques derive delay estimates on a multipath signal, followed by estimates developed by use of a spatially blind antenna array according to an embodiment of the present disclosure.

A sequence of blocks of signal received concurrent in time at the two antennas are denoted by $r_{j,k}$ where k=1, 2 and j=1, 2, ... J, the index j counts the blocks and of course the index k references the antennas, two in this case. It is, of course, to be understood by those of skill in the art that the present discussion is exemplary only and that the techniques described herein are in no way limited to antenna arrays composed of only two antenna elements. The disclosed techniques are applicable to antenna arrays of an arbitrary number of antenna elements. If the source data associated with each block is known, possibly from demodulating the received signal at either or both of the antennas, or by demodulation at some other receiver, the delay matrix can be developed as illustrated in the previous section and this can be used to derive channel impulse response estimates for each block at each antenna. Thus $h_{j,k} = (Z_j Z_j^H)^{-1} Z_j r_{j,k}$, where $h_{j,k}$ is the impulse response estimate for block j and antenna k, and $Z_j$ is the delay matrix for block j.

The vectorized aggregate space-time impulse response for block j is given by $$I_j = \begin{bmatrix} h_{j,1} \\ h_{j,2} \end{bmatrix},$$

from which an estimated covariance matrix for the sequence of blocks can then be formed as $$C = \sum_{j=1}^{J} I_j I_j^H.$$

Most known methods for extracting an arrival angle do so by operations on C. Other methods that operate on the sequence {I_j} differently can also be used.

All established techniques for estimating the path delays and arrival angles in the space-time context require knowledge of the array manifold A which is the aggregate of all possible vectors:

$$a(\theta) = \begin{bmatrix} a_1(\theta) \\ a_2(\theta) \end{bmatrix}$$

in which $\alpha_k(\theta)$ is the complex gain of antenna k for a signal arriving from angle θ. Explicit knowledge of antenna gain for each antenna is required. In addition, the pulse shaping function and thus the delay manifold G as detailed in the previous section are also needed.

Most established prior art techniques estimate the delays and arrival angles of the multi-path signals by decomposition of the covariance matrix into a sum of estimated impulse responses. This is done using the space-time manifold:

$$K = A \otimes G.$$

The estimated covariance matrix is resolved into estimates of the impulse responses associated with each multi-path component. Each estimated impulse response is drawn from K and therefore points directly to a particular delay and arrival angle.

In accordance with an embodiment of the disclosed subject matter, an example using a spatially blind estimation techniques for the time delay estimates is illustrated below for the same scenarios as described above.

To obtain the delay estimate without knowledge of the antenna array or an explicit knowledge of the antenna gains, a fictitious array manifold is used, $A'_f$ given by the aggregate of all vectors, $$a = \begin{bmatrix} a_1 \\ a_2 \end{bmatrix}$$

where $\alpha_1$ and $\alpha_2$ range over the set of complex numbers. It is worthy to note that while the delay estimates can be determined for multi-path signals independently of the antenna characteristics, angle of arrival cannot be determined in the same manner. This is not a problem if all that is of concern is the relative time delays of the multipath signals and the angles of arrival of those multipath signals is not of consequence.

The process estimates the delays without knowledge of the actual array manifold A by using instead the fictitious manifold $A'_f$, so that $A'_f$ replaces A in the space-time manifold K=A⊗G. This then becomes the aggregate of vectors, $$K = \begin{bmatrix} a_1 g(\tau) \\ a_2 g(\tau) \end{bmatrix},$$

as $\alpha_1$ and $\alpha_2$ cover the space of complex numbers and τ covers the expected range of multi-path delays.

Figure 4:
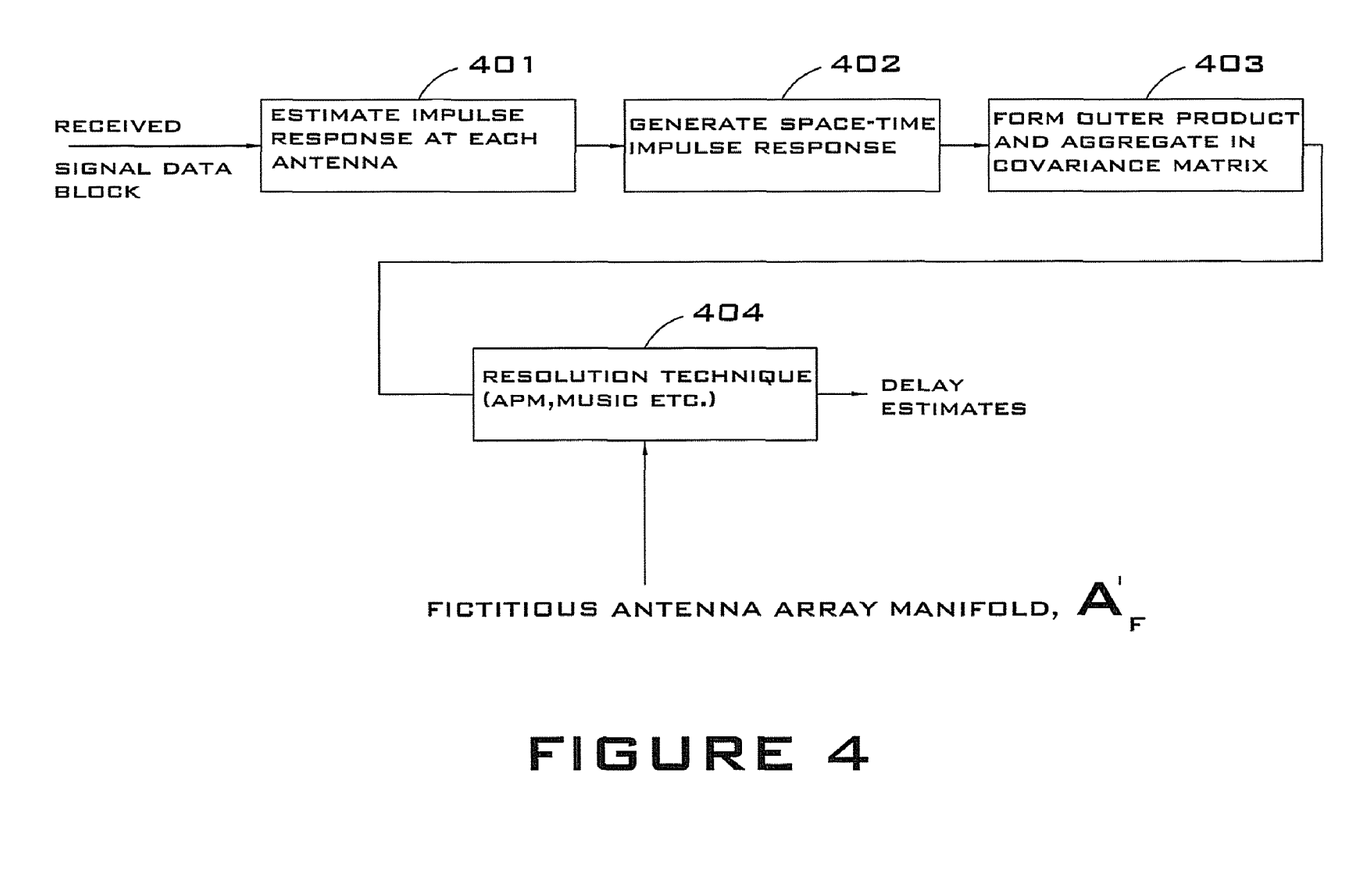
FIG. 4 is a representative flow chart for estimating delays of multipath components of a received signal according to an embodiment of a system/method of the present disclosure.

The estimated covariance matrix is resolved in order to estimate the impulse responses associated with each multi-path component. Each estimated impulse response is drawn from $K_f$ and maps directly to a particular τ and complex vector $[\alpha_1, \alpha_2]'$. The signal processing flow for this embodiment is shown in FIG. 4. An estimate of the impulse response is determined at each antenna element as shown in block 401. From the impulse response, a space-time impulse response in generated in block 402 and an outer product and aggregate in the covariance matrix is formed in block 403. In block 404, the covariance matrix is resolved with the specific fictitious antenna array manifold $A'_f$.

The earliest arrival time is of particular interest in many applications such as cellular geo-location. This technique, termed BLind Space Time ("BLST") permits the estimation of relative delays in multi-path signal components using arbitrary configurations of antennas in an array. This, for example, allows one to apply the method to antennas that are separated by arbitrary distances and with arbitrary gain characteristics. Existing antenna configurations in the cellular wireless network can be used without the need for calibration of the array. Calibration is a tedious task that needs to be updated often as a known array is required for signal processing according to the prior art. Thus the use of Blind-Space Time for estimating multi-path delays allows for the application to any arbitrary antenna array without requiring calibration.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a method for estimating the multi-path delays in a signal received at an antenna array of k antenna elements, comprising estimating an impulse response at each k antenna, generating a space-time impulse response, forming a covariance matrix and resolving the covariance matrix with a known antenna array manifold, the improvement comprising the step of resolving the covariance matrix with a fictitious antenna array manifold.

2. The method of claim 1 wherein the covariance matrix "C" is generated according to the following equation:

$$C = \Sigma I I^H.$$

3. The method of claim 1, wherein the fictitious array manifold is used to form a space-time manifold and the space-time manifold operates to resolve the multi-path delays.

4. The method of claim 1 wherein the step of resolving the covariance matrix C to determine multi-path delays uses the method of MUltiple SIgnal Classification (MUSIC) techniques.

5. The method of claim 1 wherein the step of resolving the covariance matrix C to determine multi-path delays uses the Method of Alternating Projection (APM).

6. The method of claim 1, wherein the space-time impulse response "I" is formed by stacking individual impulse response estimates into a column vector.

7. The method of claim 1, wherein the fictitious manifold is the aggregate of all vectors:

$$a = \begin{bmatrix} a_1 \\ a_2 \\ \vdots \\ a_m \end{bmatrix},$$

where ak (k=1, 2, . . . m) range over the set of complex numbers, where m is the number of an antenna element in the array.

8. The method of claim 1, wherein the step of resolving the covariance matrix C to determine multi-path delays uses Alternating Projection.

* * * * *